United States Patent
Lipschutz

(10) Patent No.: US 10,711,360 B2
(45) Date of Patent: Jul. 14, 2020

(54) NICKEL ELECTROPLATING COMPOSITIONS WITH COPOLYMERS OF ARGININE AND BISEPOXIDES AND METHODS OF ELECTROPLATING NICKEL

(71) Applicant: Rohm and Haas Electronic Materials LLC, Marlborough, MA (US)

(72) Inventor: Michael Lipschutz, Natick, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 273 days.

(21) Appl. No.: 15/974,787

(22) Filed: May 9, 2018

(65) Prior Publication Data

US 2019/0017187 A1    Jan. 17, 2019

Related U.S. Application Data

(60) Provisional application No. 62/532,542, filed on Jul. 14, 2017.

(51) Int. Cl.
| | | |
|---|---|---|
| *C25D 3/18* | (2006.01) | |
| *C08G 73/02* | (2006.01) | |
| *C25D 3/12* | (2006.01) | |

(52) U.S. Cl.
CPC ............. *C25D 3/18* (2013.01); *C08G 73/024* (2013.01); *C25D 3/12* (2013.01)

(58) Field of Classification Search
CPC ........................................................ C25D 3/18
USPC ......................................... 205/259, 278, 280
See application file for complete search history.

(56) References Cited

U.S. PATENT DOCUMENTS

| | | | |
|---|---|---|---|
| 2,635,076 | A | 4/1953 | Du Rose |
| 5,985,124 | A | 11/1999 | Yoda et al. |
| 2015/0090600 | A1 | 4/2015 | Inoue et al. |
| 2016/0186346 | A1* | 6/2016 | Niazimbetova ........ C25D 3/38 205/296 |
| 2017/0037527 | A1 | 2/2017 | Thorseth et al. |

OTHER PUBLICATIONS

Schmitz et al, "Influence of commercial organic additives on the nickel electroplating", International Journal of Electrochemical Science, Jan. 2016, pp. 983-997, vol. 11.

Oniciu et al, "Some fundamental aspects of levelling and brightening in metal electrodeposition", Journal of Applied Electrochemistry, Jul. 1991, pp. 565-574, vol. 21, No. 7.

Search report for corresponding Europe Application No. 18 18 2556 dated Sep. 27, 2018.

Search report for corresponding China Application No. 201810632527.4 dated Feb. 16, 2020.

* cited by examiner

*Primary Examiner* — Edna Wong
(74) *Attorney, Agent, or Firm* — John J. Piskorski

(57) ABSTRACT

Nickel electroplating compositions containing copolymers of arginine and a bisepoxide enable the electroplating of nickel deposits which have uniform bright surfaces over wide current density ranges.

9 Claims, No Drawings

NICKEL ELECTROPLATING COMPOSITIONS WITH COPOLYMERS OF ARGININE AND BISEPOXIDES AND METHODS OF ELECTROPLATING NICKEL

FIELD OF THE INVENTION

The present invention is directed to nickel electroplating compositions with copolymers of arginine and bisepoxides and methods of electroplating nickel. More specifically, the present invention is directed to nickel electroplating compositions with copolymers of arginine and bisepoxides and methods of electroplating nickel where the nickel deposits have at least uniform brightness across the surface over wide current density ranges.

BACKGROUND OF THE INVENTION

Bright nickel electroplating baths are used in the automotive, electrical, appliance, hardware and various other industries. One of the most commonly known and used nickel electroplating baths is the Watts bath. A typical Watts bath includes nickel sulfate, nickel chloride and boric acid. The Watts bath typically operates at a pH range of 2-5.2, a plating temperature range of 30-70° C. and a current density range of 1-6 amperes/dm$^2$. Nickel sulfate is included in the baths in comparatively large amounts to provide the desired nickel ion concentration. Nickel chloride improves anode corrosion and increases conductivity. Boric acid is used as a weak buffer to maintain the pH of the bath. In order to achieve bright and lustrous deposits, organic and inorganic brightening agents are often added to the baths. Examples of typical organic brighteners are sodium saccharinate, naphthalene trisulfonate, sodium allyl sulfonate, coumarin, propargyl alcohol and diethyl propargyldiol.

Although many conventional additives for nickel electroplating baths have sufficed to provide semi-bright to bright nickel deposits as well as uniformity of appearance and plating speeds, in general, multiple additives are included to achieve the desired nickel plating performance In some nickel electroplating compositions as many as six additives are included to achieve the desired nickel plating performance and deposit. A disadvantage of such nickel electroplating baths is the difficulty in controlling the bath performance and deposit appearance. To achieve the desired bath performance and deposit appearance the additives must be in proper balance, otherwise an inferior and unacceptable nickel deposit is obtained and plating performance is inefficient. Workers using the bath necessarily have to monitor the concentrations of bath additives and the greater number the additives in the bath the more difficult and time consuming it is to monitor the bath. During plating many of the bath additives breakdown into compounds which can compromise nickel plating. Some additives are included in the baths at concentrations as high as 5 g/L. The higher the concentration of the additives the greater the breakdown products. The breakdown products must be removed at some point during the plating process and the nickel baths must be replenished with new additives to compensate for the additives which have broken down to maintain plating performance and deposit quality. Additive replenishment should be substantially accurate. Another problem associated with high concentrations of additives in nickel plating baths is that additives can co-deposit with the nickel which negatively impacts the properties of the deposit causing embrittlement and increased internal stress. Ductility of the nickel deposit is also compromised. Sulfur containing additives are particularly pernicious in their effects on ductility.

An example of a conventional non-sulfur containing nickel bath additive which has had mixed performance is coumarin. Coumarin has been included in nickel plating baths to provide a high-leveling, ductile, semi-bright and sulfur-free nickel deposits from a Watts bath. Leveling refers to the ability of the nickel deposit to fill in and smooth out surface defects such as scratches and polish lines. An example of a typical nickel plating bath with coumarin contains about 150-200 mg/L coumarin and about 30 mg/L formaldehyde. A high concentration of coumarin in the bath provides very good leveling performance; however, such performance is short-lived. Such high coumarin concentrations result in a high rate of detrimental breakdown products. The breakdown products are undesirable because they can cause non-uniform, dull gray areas in the deposit that are not easily brightened by subsequent bright nickel deposits. They can reduce the leveling performance of the nickel bath as well as reduce other beneficial physical properties of the nickel deposit. To address the problem workers in the industry have proposed to reduce the coumarin concentrations and add formaldehyde and chloral hydrate; however, use of such additives in moderate concentrations not only increases tensile stress of the nickel deposits but also compromise leveling performance of the baths. Further, many government regulations, such as REACh, consider formaldehyde, as well as coumarin compounds harmful to the environment. Therefore, use of such compounds is discouraged in the plating industry.

It is important to provide highly leveled bright nickel deposits without sacrificing deposit ductility and internal stress. The internal stress of the plated nickel deposit can be compressive stress or tensile stress. Compressive stress is where the deposit expands to relieve the stress. In contrast, tensile stress is where the deposit contracts. Highly compressed deposits can result in blisters, warping or cause the deposit to separate from the substrate, while deposits with high tensile stress can also cause warping in addition to cracking and reduction in fatigue strength.

As briefly mentioned above, nickel electroplating baths are used in a variety of industries. Nickel electroplating baths are typically used in electroplating nickel layers on electrical connectors and leadframes. Such articles have irregular shapes and are composed of metal such as copper and copper alloys with relatively rough surfaces. Therefore, during nickel electroplating, the current density is non-uniform across the articles often resulting in nickel deposits which are unacceptably non-uniform in thickness and appearance across the articles.

Accordingly, there is a need for nickel electroplating compositions and methods to provide bright and uniform nickel deposits, even across a wide current density range, good ductility and which have a reduced number of additives.

SUMMARY OF THE INVENTION

The present invention is directed to nickel electroplating compositions including one or more sources of nickel ions, one or more compounds chosen from sodium saccharinate, boric acid and salts of boric acid, optionally, one or more sources of acetate ions, and one or more copolymers of arginine and one or more bisepoxides, wherein the one or more bisepoxides have a formula:

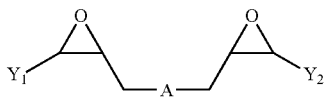

wherein $Y_1$ and $Y_2$ are independently chosen from H and linear or branched ($C_1$-$C_4$)alkyl; A is $OR_1$ or $R_2$, wherein $R_1$ is $((CR_3R_4)_m O)_n$, wherein $R_3$ and $R_4$ are independently chosen from H, hydroxyl and methyl, and $R_2$ is $(CH_2)_y$, wherein m is a number from 1 to 6, n is a number from 1 to 20 and y is a number from 0 to 6 and when y is 0, A is a covalent chemical bond.

The present invention is also directed to methods of electroplating nickel metal on a substrate including:

a) providing the substrate;
b) contacting the substrate with a nickel electroplating composition comprising one or more sources of nickel ions, one or more compounds chosen from sodium saccharinate, boric acid and salts of boric acid, optionally, one or more sources of acetate ions, and one or more copolymers of arginine and one or more bisepoxides, wherein the one or more bisepoxides have a formula:

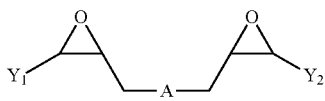

wherein $Y_1$ and $Y_2$ are independently chosen from H and linear or branched ($C_1$-$C_4$)alkyl; A is $OR_1$ or $R_2$, wherein $R_1$ is $((CR_3R_4)_m O)_n$, wherein $R_3$ and $R_4$ is independently chosen from H, hydroxyl and methyl, and $R_2$ is $(CH_2)_y$, wherein m is a number from 1 to 6, n is a number from 1 to 20 and y is a number from 0 to 6 and when y is 0, A is a covalent chemical bond; and
c) applying an electric current to the nickel electroplating composition and substrate to electroplate a bright and uniform nickel deposit adjacent the substrate.

The electroplated nickel deposits are bright and uniform with good leveling. The nickel electroplating compositions of the present invention can electroplate bright and uniform nickel deposits over a wide current density range even on irregular shaped articles such as electrical connectors and leadframes. The nickel electroplating compositions of the present invention enable the plating of nickel deposits of equal or greater brightness compared to conventional nickel electroplating compositions which use more additives and typically include multiple sulfur-containing additives which can be detrimental to the ductility of the nickel deposit. By using fewer additives or lower overall additive concentrations, the quantity of additives which are co-deposited with the nickel is reduced, enabling the production of bright nickel deposits which have good ductility. Lowering the overall additive concentrations lowers costs associated with additive consumption.

The reduced additives of the nickel electroplating compositions of the present invention enables easier maintenance of the nickel electroplating compositions and allows for independent analysis of some of the additives in the compositions, enabling greater control of the compositions than many conventional nickel electroplating composition. The nickel electroplating compositions of the present invention also enable the deposition of nickel deposits of equal or greater brightness compared to many conventional nickel electroplating compositions at much higher current densities. This enables the plating operator to achieve higher productivity of their production equipment.

DETAILED DESCRIPTION OF THE INVENTION

As used throughout the specification the abbreviations have the following meanings, unless the context clearly indicates otherwise: ° C.=degrees Centigrade; g=gram; mg=milligram; ppm=mg/L; L=liter; mL=milliliter; m=meters; cm=centimeter; μm=microns; DI=deionized; A=amperes; ASD=amperes/$dm^2$=current density or plating speed; DC=direct current; wt %=weight percent; H=hydrogen; CCE=cathode current efficiency; GU=gloss units; and ASTM=American standard testing method.

The term "adjacent" means directly in contact with such that two metal layers have a common interface. The term "aqueous" means water or water-based. The term "leveling" means an electroplated deposit has the ability to fill in and smooth out surface defects such as scratches or polish lines. The term "matte" means dull in appearance. The term "cathode current efficiency" means the current efficiency as applied to the cathode reaction and is the ratio of the weight of metal actually deposited to that which would have resulted if all the current had been used for deposition. The terms "composition" and "bath" are used interchangeably throughout the specification. The term "copolymer" means a reaction product of arginine and one or more bisepoxide. The term "monomer" means a molecule that forms the basic unit of a polymer or copolymer. The term "arginine" means the α-amino acid arginine and includes the D and L isomers as well as the racemic modification. The term "moiety" means a part of a molecule or functional part of a molecule. The term "covalent chemical bond" means a chemical bond that involves the sharing of electron pairs between atoms. The terms "deposit" and "layer" are used interchangeably throughout the specification. The terms "electroplating", "plating" and "depositing" are used interchangeably throughout the specification. The terms "a" and "an" can refer to both the singular and the plural throughout the specification. All numerical ranges are inclusive and combinable in any order, except where it is logical that such numerical ranges are constrained to add up to 100%.

The present invention is directed to aqueous nickel electroplating compositions and methods for electroplating nickel on substrates which provide at least bright and uniform nickel deposits over a wide current density range even on irregular shaped articles. The nickel electroplating compositions of the invention have good leveling performance and good ductility. The nickel electroplating compositions of the present invention have fewer additives in the plating compositions than many conventional nickel electroplating compositions enabling easier maintenance and greater control during electroplating of nickel. The aqueous nickel electroplating compositions of the present invention include a copolymer composed of arginine, a first monomer, and a bisepoxide compound, a second monomer, wherein the bisepoxide compounds of the present invention have a formula:

wherein $Y_1$ and $Y_2$ are independently chosen from H and linear or branched $(C_1-C_4)$alkyl; A is $OR_1$ or $R_2$, wherein $R_1$ is $((CR_3R_4)_m)O)_n$, and $R_2$ is $(CH2)_y$, $R_3$ and $R_4$ are independently chosen from H, hydroxyl and methyl, wherein m is a number from 1 to 6, n is a number from 1 to 20 and y is a number from 0 to 6 and when y is 0, A is a covalent chemical bond. Preferably, $Y_1$ and $Y_2$ are independently chosen from H and $(C_1-C_2)$alkyl, A is $R_1$ or $R_2$, $R_3$ and $R_4$ are independently chosen from H and methyl, and m is a number from 1-4, n is a number from 1-10 and y is a number from 0-4, more preferably, $Y_1$ and $Y_2$ are independently chosen from H and methyl, A is $R_1$ or $R_2$, $R_3$ and $R_4$ are H, and m is a number from 2-4, n is a number from 1-5 and y is a number from 0-4. Even more preferably, $Y_1$ and $Y_2$ are independently chosen from H and methyl, A is $R_1$, and $R_3$ and $R_4$ are H, and m is a number from 1-4 and n is a number from 1-4.

Bisepoxides compounds where A is $R_2$ have the following formula:

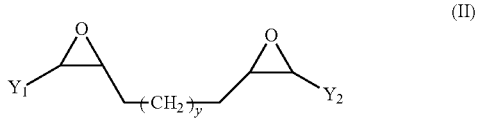

(II)

wherein $Y_1$ and $Y_2$ and y are as defined above. Most preferably, $Y_1$ and $Y_2$ are H and y is a number from 1-4 or y is a number from 2-4. Exemplary bisepoxides where $Y_1$ and $Y_2$ are H and A is $R_2$ are 1,5-diepoxyhexane, 1,7-diepoxyoctane, and 1,9-diepoxydecane.

Bisepoxide compounds where A is $OR_1$ and $R_1$ is $((CR_3R_4)_m)O)_n$ have the following formula:

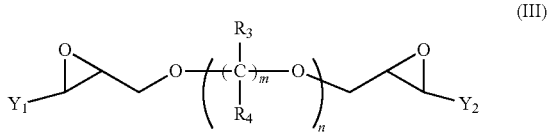

(III)

wherein $Y_1$, $Y_2$, $R_3$, $R_4$, m and n are as defined above. Most preferably, $Y_1$ and $Y_2$ are H, and when m is 2 each $R_3$ is H and $R_4$ is chosen from H and methyl, and n is a number from 1-10. When m is 3, it is most preferred, that at least one $R_4$ is chosen from methyl and hydroxyl and n is 1. When m is 4, it is most preferred, that both $R_3$ and $R_4$ are H and n is 1.

Exemplary compounds of formula (III) are 1,4-butanediol diglycidyl ether, ethylene glycol diglycidyl ether, di(ethylene glycol) diglycidyl ether, poly(ethylene glycol) diglycidyl ether compounds, glycerol diglycidyl ether, neopentyl glycol diglycidyl ether, propylene glycol diglycidyl ether, di(propylene glycol) diglycidyl ether, and poly(propylene glycol) diglycidyl ether compounds.

The arginine and the bisepoxide compounds (monomers) useful in the present invention can be obtained from a variety of commercial sources, such as Sigma-Aldrich, or can be prepared using a variety of literature methods known in the art. The arginine of the present invention can be the D or L isomer as well as the racemic mixture, preferably, the isomer L-arginine is used to prepare the copolymers of the present invention.

The copolymers of the present invention are a reaction product of arginine, preferably L-arginine, a first monomer, and one or more bisepoxides, a second monomer, having the formulae described above. The order of addition of monomers to a reaction vessel may vary, however, preferably, arginine is dissolved in water at 80° C. with dropwise addition of one or more bisepoxides. The temperature of the heating bath is then increased from 80° C. to 95° C. Heating with stirring is done for 2 hours to 4 hours. After an additional 6-12 hours of stirring at room temperature, the resulting reaction product is diluted with water. The reaction product may be used as-is in aqueous solution, may be purified or may be isolated as desired. Typically, the molar ratio of the arginine to the one or more bisepoxide compounds is from 0.1:10 to 10:0.1, preferably, the molar ratio is from 1:5 to 5:1 and more preferably from 1:2 to 2:1. Other suitable ratios of arginine to bisepoxide compound can be used to prepare the copolymer of the present invention. Minor experimentation can be done to arrive at the preferred parameters for specific bisepoxides used to make the copolymers with arginine.

In general, the copolymers of the present invention have a number average molecular weight (Mn) of 200 to 100,000, typically from 300 to 50,000, preferably from 500 to 30,000, although reaction products having other Mn values can be used. Such reaction products can have a weight average molecular weight (Mw) value in the range of 1000 to 50,000, typically from 5000 to 30,000, although other Mw values can be used.

In general, the copolymer of the present invention can be included in the aqueous nickel electroplating compositions in amounts of at least 0.1 ppm, preferably, in amounts of 0.1 ppm to 20 ppm, even more preferably, in amounts of 0.5 ppm to 15 ppm, still more preferably, from 0.5 ppm to 15 ppm, even further preferably, in amounts of 1 ppm to 10 ppm, and, most preferably, from 5 ppm to 10 ppm.

One or more sources of nickel ions are included in the aqueous nickel electroplating compositions in sufficient amounts to provide nickel ion concentrations of at least 25 g/L, preferably, from 30 g/L to 150 g/L, more preferably, from 35 g/L to 125 g/L, even more preferably, from 40 g/L to 100 g/L, still even more preferably, from 45 g/L to 95, g/L, still further preferably, from 50 g/L to 90 g/L, and, most preferably, from 50 g/L to 80 g/L.

One or more sources of nickel ions include nickel salts which are soluble in water. One or more sources of nickel ions include, but are not limited to, nickel sulfate and its hydrated forms nickel sulfate hexahydrate and nickel sulfate heptahydrate, nickel sulfamate and its hydrated form nickel sulfamate tetrahydrate, nickel chloride and its hydrated form nickel chloride hexahydrate, and nickel acetate and its hydrated from nickel acetate tetrahydrate. The one or more sources of nickel ions are included in the aqueous nickel electroplating compositions in sufficient amounts to provide the desired nickel ion concentrations disclosed above. Nickel acetate or its hydrated form can be included in the aqueous nickel electroplating compositions, preferably, in amounts of 15 g/L to 45 g/L, more preferably from 20 g/L to 40 g/L. When nickel sulfate is included in the aqueous nickel electroplating compositions, preferably, nickel sulfamate or its hydrated form, is excluded. Nickel sulfate can be included in the aqueous nickel electroplating compositions, preferably in amounts of 100 g/L to 550 g/L, more preferably in amounts of 150 g/L to 350 g/L. When nickel sulfamate or its hydrated form is included in the aqueous nickel electroplating compositions they can be included in amounts, preferably, from 120 g/L to 675 g/L, more preferably from 200 g/L to 450 g/L. Nickel chloride or its hydrated form can be included in the aqueous nickel electroplating compositions in amounts, preferably, from 0 to 60 g/L, more preferably, 1 g/L to 22 g/L, even more preferably, 5 g/L to 20 g/L, most preferably, from 5 g/L to 15 g/L.

One or more compounds chosen from boric acid, salts of boric acid and sodium saccharinate are included in the nickel electroplating compositions. Boric acid salts include sodium borate, sodium tetraborate and disodium tetraborate. Preferably, sodium saccharinate is included in the nickel electroplating compositions. When sodium saccharinate is included in the nickel electroplating compositions, it is most preferred to exclude boric acid and its salts from the compositions and include one or more sources of acetate ions.

When boric acid or salts thereof are included in the nickel electroplating compositions they are included in amounts of 5 g/L to 50 g/L, preferably, 10 g/L to 45 g/L, more preferably, from 20 g/L to 35 g/L.

When sodium saccharinate is included in the nickel electroplating compositions, it is included in amounts of at least 100 ppm. Preferably, sodium saccharinate is included in amounts from 100 ppm to 10,000 ppm, more preferably, from 100 ppm to 5000 ppm, most preferably from 100 ppm to 1000 ppm.

Optionally, one or more sources of acetate ions are included in the aqueous nickel electroplating compositions. Sources of acetate ions include, but are not limited to, nickel acetate, nickel acetate tetrahydrate, alkali metal salts of acetate such as lithium acetate, sodium acetate and potassium acetate, and acetic acid. When the alkali metal salts are included in the nickel electroplating compositions, preferably, one or more of sodium acetate and potassium acetate are chosen, more preferably, sodium acetate is chosen. When one or more sources of acetate ions are included in the nickel electroplating compositions, it is preferred to exclude boric acid and salts thereof from the nickel electroplating compositions. Preferably, sufficient amounts of one or more of the sources of acetate ions are added to the nickel electroplating composition to provide an acetate ion concentration of at least 5 g/L, preferably, 5 g/L to 30 g/L, more preferably, from 10 g/L to 25 g/L.

Optionally, one or more sources of chloride ions can be included in the aqueous nickel electroplating composition. Sufficient amounts of one or more sources of chloride ions can be added to the aqueous nickel electroplating composition to provide a chloride ion concentration from 0 to 20 g/L, preferably, 0.5 to 20 g/L, more preferably, from 1 g/L to 15 g/L, even more preferably, from 2 g/L to 10 g/L. When nickel electroplating is done using insoluble anodes, such as insoluble anodes containing platinum or platinized titanium, preferably, the nickel electroplating composition is free of chloride. Sources of chloride include, but are not limited to, nickel chloride, nickel chloride hexahydrate, hydrogen chloride, alkali metal salts such as sodium chloride and potassium chloride. Preferably, the source of chloride is nickel chloride and nickel chloride hexahydrate. Preferably, chloride is included in the aqueous nickel electroplating compositions.

The aqueous nickel electroplating compositions are acidic and the pH preferably ranges from 2 to 6, more preferably, from 3 to 5, even more preferably, from 4 to 5. Inorganic acids, organic acids, inorganic bases or organic bases can be used to buffer the aqueous nickel electroplating compositions. Such acids include, but are not limited to, inorganic acids such as sulfuric acid, hydrochloric acid and sulfamic acid. Organic acids such as acetic acid, amino acetic acid and ascorbic acid can be used. Inorganic bases such as sodium hydroxide and potassium hydroxide and organic bases such as various types of amines can be used. Preferably, the buffers are chosen from acetic acid and amino acetic acid. Most preferably, the buffer is acetic acid. When boric acid is included in the nickel electroplating compositions it can function as a buffer. The buffers can be added in amounts as needed to maintain a desired pH range. The mildly acid environment of the nickel electroplating compositions of the present invention enable the reaction products of the present invention to remain partially or fully protonated such that at least one of the nitrogen atoms of the imidazole moieties of the reaction product maintains a positive charge in the nickel electroplating composition, thus the reaction product of the present invention is a cationic polymer.

Optionally, one or more conventional brighteners can be included in the aqueous nickel electroplating compositions. Optional brighteners include, but are not limited to, 2-butyne-1,4-diol, 1-butyne-1,4-diol ethoxylate and 1-ethynyl-cyclohexylamine Such brighteners can be included in amounts of 0.5 g/L to 10 g/L. Preferably, such optional brighteners are excluded from the aqueous nickel electroplating compositions.

Conventional brighteners typically used in nickel electroplating baths such as coumarin, propargyl alcohol, diethyl propargyldiol, napththalene sulfonate, sodium allyl sulfonate are excluded from the nickel electroplating compositions of the present invention. With the exception of sodium saccharinate, nickel sulfonate, nickel sulfamate, sulfamic acid, and certain sulfur containing surfactants, the nickel electroplating compositions of the present invention are, preferably, substantially free of sulfur containing compounds.

Optionally, one or more surfactants can be included in the aqueous nickel electroplating compositions of the invention. Such surface active agents include, but are not limited to, ionic surfactants such as cationic and anionic surfactants, non-ionic surfactants and amphoteric surfactants. Surfactants can be used in conventional amounts such as 0.05 g/L to 30 g/L.

Examples of surfactants which can be used are anionic surfactants such as sodium di(1,3-dimethylbutyl) sulfosuccinate, sodium-2-ethylhexylsulfate, sodium diamyl sulfosuccinate, sodium lauryl sulfate, sodium lauryl ether-sulfate, sodium di-alkylsulfosuccinates and sodium dodecylbenzene sulfonate, and cationic surfactants such as quaternary ammonium salts such as perfluorinated quaternary amines.

Other optional additives can include, but are not limited to, levelers, chelating agents, complexing agents and biocides. Such optional additives can be included in conventional amounts.

Except for unavoidable metal contaminants, the aqueous nickel electroplating compositions of the present invention are free of any alloying metals or metals which typically are included in metal plating baths to brighten or improve the luster of the metal deposit. The aqueous nickel electroplating compositions of the present invention deposit bright and uniform nickel metal layers which have substantially smooth surfaces with a minimum number of components in the electroplating compositions.

The aqueous nickel electroplating compositions of the present invention may be prepared by combining the components in any order. It is preferred that the inorganic components such as sources of nickel ions, water, boric acid and salts thereof and optional chloride ion source, are first added to the composition vessel followed by the organic components such as sodium saccharinate, acetate ion sources, acetic acid and any other optional organic component.

Preferably, the aqueous nickel electroplating compositions of the present invention are composed of one or more sources of nickel ions, wherein the one or more sources of nickel ions provide a sufficient amount of nickel ions in solution to plate nickel and the corresponding counter anions from the one or more sources of nickel ions, one or more copolymers of arginine and one or more bisepoxides, optionally, one or more sources of acetate ions and the corresponding counter cations, one or more of sodium saccharinate, boric acid and salts of boric acid, optionally, one or more sources of chloride ions and corresponding counter cations, optionally, one or more surfactants, and water.

More preferably, the aqueous nickel electroplating compositions of the present invention are composed of one or more sources of nickel ions, wherein the one or more sources of nickel ions provide a sufficient amount of nickel ions in solution to plate nickel and the corresponding counter anions from the one or more sources of nickel ions, one or more copolymers of arginine and one or more bisepoxides, sodium saccharinate, one or more sources of acetate ions and the corresponding counter cations, optionally, one or more sources of chloride ions and corresponding cations, optionally, one or more surfactants, and water.

Even more preferably, the aqueous nickel electroplating compositions of the present invention are composed of one or more sources of nickel ions, wherein the one or more sources of nickel ions provide a sufficient amount of nickel ions in solution to plate nickel and the corresponding counter anions from the one or more sources of nickel ions, one or more copolymers of arginine and one or more bisepoxides, sodium saccharinate, one or more sources of acetate ions, wherein a source of acetate ions is chosen from one or more of nickel acetate, nickel acetate tetrahydrate, alkali metal salts of acetate and acetic acid, one or more sources of chloride ions and corresponding cations, optionally, one or more surfactants, and water.

The aqueous nickel electroplating compositions of the present invention use fewer additives or lower overall additive concentrations, thus the quantity of additives which are co-deposited with the nickel is reduced, enabling the production of bright nickel deposits which have good ductility. Lowering the overall additive concentrations also lowers costs associated with additive consumption during electroplating.

The aqueous environmentally friendly nickel electroplating compositions of the present invention can be used to deposit nickel layers on various substrates, both conductive and semiconductive substrates. Preferably the substrates on which nickel layers are deposited are copper and copper alloy substrates. Such copper alloy substrates include, but are not limited to, brass and bronze. The electroplating composition temperatures during plating can range from room temperature to 70° C., preferably, from 30° C. to 60° C., more preferably, from 40° C. to 60° C. The nickel electroplating compositions are preferably under continuous agitation during electroplating.

In general, the nickel metal electroplating method includes providing the aqueous nickel electroplating composition of the present invention and contacting the substrate with the aqueous nickel electroplating composition such as by immersing the substrate in the composition or spraying the substrate with the composition. Applying a current with a conventional rectifier where the substrate functions as a cathode and there is present a counter electrode or anode. The anode can be any conventional soluble or insoluble anode used for electroplating nickel metal adjacent a surface of a substrate. The aqueous nickel electroplating compositions of the present invention enable deposition of bright and uniform nickel metal layers over broad current density ranges. Many substrates are irregular in shape and typically have discontinuous metal surfaces. Accordingly, current densities can vary across the surface of such substrates typically resulting in non-uniform metal deposits during plating. Also, the surface brightness is typically irregular with combinations of matte and bright deposits when nickel is plated from conventional nickel plating baths. Nickel metal plated from the nickel electroplating compositions of the present invention enable substantially smooth, uniform, bright nickel deposits across the surface of the substrates, including irregular shaped substrates, over wide current density ranges. In addition, the nickel electroplating compositions of the present invention enable plating of substantially uniform and bright nickel deposits to cover scratches and polishing marks on metal substrates.

Current densities can range from 0.1 ASD or higher. Preferably, the current densities range from 0.5 ASD to 70 ASD, more preferably, from 1 ASD to 40 ASD, even more preferably, from 5 ASD to 30 ASD. When the nickel electroplating compositions are used in reel-to-reel electroplating, the current densities can range from 5 ASD to 70 ASD, more preferably from 5 ASD to 50 ASD, even more preferably from 5 ASD to 30 ASD. When nickel electroplating is done at current densities from 60 ASD to 70 ASD, preferably, the one or more sources of nickel ions are included in the nickel electroplating compositions in amounts of 90 g/L or greater, more preferably, from 90 g/L to 150 g/L, even more preferably, from 90 g/L to 125 g/L, most preferably, from 90 g/L to 100 g/L.

In general, the thickness of the nickel metal layers can range from 1 µm or greater. Preferably, the nickel layers have thickness ranges of 1 µm to 100 µm, more preferably, from 1 µm to 50 µm, even more preferably, from 1 µm to 10 µm.

The following examples are included to further illustrate the invention but are not intended to limit its scope.

EXAMPLE 1

Synthesis of a Copolymer of L-Ariginine and 1,4-Butanediol Diglycidyl Ether

In 250 mL round-bottom, three-neck flask equipped with a condenser and a thermometer, 100 mmol of L-Arginine and 20 mL of DI water are added followed by addition of 100 mmol of 1,4-butanediol diglycidyl ether at around 80° C. The resulting mixture is heated for about 5 hours using an oil bath set to 95° C. and then left to stir at room temperature for additional 6 hours. An amber-red colored viscous reaction product is transferred into a container, rinsed and adjusted with DI water. The reaction product solution is used without further purification.

EXAMPLE 2

Hull Cell Plating—Brightness of Nickel Deposits

The following three aqueous nickel electroplating baths are prepared having the components disclosed in the table below.

TABLE 1

| COMPONENT | BATH 1 | COMPARATIVE BATH 1 | COMPARATIVE BATH 2 |
|---|---|---|---|
| Nickel ions (total) | 70 g/L | 70 g/L | 70 g/L |
| Chloride ions (total) | 18 g/L | 18 g/L | 18 g/L |
| Nickel chloride hexahydrate | 60 g/L | 60 g/L | 60 g/L |
| Nickel sulfate hexahydrate | 250 g/L | 250 g/L | 250 g/L |
| Boric acid | 45 g/L | 45 g/L | 45 g/L |
| Sodium saccharinate | 1.25 g/L | 5.78 g/L | 1.28 g/L |
| Sodium allyl sulfonate | — | 14 g/L | 14 g/L |
| Copolymer of Example 1 | 5 ppm | — | — |
| Copolymer of 2-butyne-1,4-diol and epichlorohydrin[1] | — | 0.31 g/L | 0.31 g/L |
| 2-butyne-1,4-diol ethoxylate | — | 0.08 g/L | 0.08 g/L |
| Water | To one liter | To one liter | To one liter |

[1]LR-1200 available from Optima Chemical Group LLC

Bath 1 and Comparative Bath 1 are placed in individual Hull cells with a brass panel taped to expose 1.5 cm×10 cm in area in the center of the panel and a ruler along the base of each Hull cell with calibrations of varying current densities or plating speeds. The anode is a sulfurized nickel electrode. Nickel electroplating is done for each bath for 2 minutes. The baths are agitated by air agitation at 1.5 L/m during the entire plating time. The baths are at a pH of 4.7 and the temperatures of the baths are at about 55° C. The current is 2.5A. DC current is applied producing a nickel layer on the brass panels deposited with a continuous current density range of 0-30 ASD. After plating, the panels are removed from the Hull cells, rinsed with DI water and air dried.

The panels from both baths appear uniform and bright over the entire current density range. The brightness of the panel is quantitatively evaluated using ASTM D523 standard test method. Measurements are taken with micro-TRI-gloss a gloss meter available from BYK Gardner. Measurements are taken at a 20° reflection angle in accordance with ASTM D523 which recommends such angles for surfaces with a gloss of greater than 70 GU. The brightness is measured at 30 ASD because it is where the nickel deposit is thickest and provides the greatest chance to brighten. The brightness of the nickel plated from Comparative Bath 1 is 1381 gloss units. In contrast, the brightness of the nickel plated from Bath 1 is measured at 1432 gloss units. The results show that the nickel layer plated on the brass panel from Bath 1 which includes the copolymer of arginine and 1,4-butanediol diglycidyl ether and has reduced organic components by about 94wt % compared to Comparative Bath 1 has a uniform nickel deposit of greater brightness.

The same nickel plating process is repeated using Comparative Bath 2 which has a reduced sodium saccharinate level in contrast to Comparative Bath 1 and substantially the same level of sodium saccharinate as Bath 1. After nickel electroplating is done over a continuous current density range of 0-30 ASD, the nickel plated panel is observed for uniformity of brightness. At 30 ASD the brightness is measured to be 1268 gloss units. This is about an 11.5% reduced brightness level than Bath 1.

EXAMPLE 3

Ductility of Nickel Deposits

A nickel electroplating bath is prepared as shown in the table below.

TABLE 2

| COMPONENT | BATH 2 |
|---|---|
| Nickel ions (total) | 70 g/L |
| Chloride ions (total) | 18 g/L |
| Nickel chloride hexahydrate | 60 g/L |
| Nickel sulfate hexahydrate | 250 g/L |
| Boric acid | 45 g/L |
| Sodium saccharianate | 1.28 g/L |
| Copolymer of Example 1 | 5 ppm |
| Water | To one liter |

An elongation test is performed on nickel deposits electroplated from the nickel plating composition of Bath 2 above at a pH of 4.6 and Comparative Bath 2 from Example 2 to determine ductility of the nickel deposits. The ductility test is done substantially according to industrial standard ASTM B489-85: Bend Test for Ductility of Electrodeposited and Autocatalytically Deposited Metal Coatings on Metals.

A plurality of brass panels is provided. The brass panels are plated for one minute to a target thickness of 1.3 μm. Electroplating is done at about 60° C. at 10 ASD. The plated panels are bent 180° over mandrels of various diameters ranging from 0.32 cm to 1.3 cm and then examined under a 50× microscope for cracks in the deposit. The smallest diameter tested for which no cracks are observed is then used to calculate the degree of elongation of the deposit. The average elongation for the nickel deposits plated from Comparative Bath 2 is found to be 3.5%. The average elongation of the nickel deposits from Bath 2 is found to be 5.2%. The 1.7 percentage point increase in the elongation of the nickel deposits from Bath 2 represents a 49% improvement in ductility of the deposits from Bath 2 over the Comparative Bath 2 which did not include the copolymer of the present invention.

EXAMPLE 4

Electroplating a Bright Nickel Deposit With a Nickel Electroplating Composition Containing a Copolymer of L-Arginine and 1,4-Butanediol Diglycidyl Ether at pH >4 and Without Boric Acid A nickel electroplating composition of the invention having the components disclosed in the table below is prepared.

TABLE 3

| COMPONENT | AMOUNT |
|---|---|
| Nickel ions (total) | 90 g/L |
| Chloride ions (total) | 3 g/L |
| Acetate ions (total) | 13.5 g/L |
| Nickel chloride hexahydrate | 10 g/L |
| Nickel acetate tetrahydrate | 25 g/L |
| Nickel sulfate hexahydrate | 365 g/L |
| Acetic acid | 1.35 g/L |
| Sodium saccharinate | 0.15 g/L |
| Copolymer of Example 1 | 10 ppm |
| Water | To one liter |

The composition is placed in a Hull cell with a brass panel and a ruler along the base of the Hull cell with calibrations of varying current densities or plating speeds. The anode is a sulfurized nickel electrode. Nickel electroplating is done for 5 minutes. The composition is agitated with the Hull cell paddle agitator during the entire plating time. The composition is at a pH of 4 and the temperature of the bath is at about 60° C. The current is 3 A. DC current is applied, producing a nickel layer on the brass panel deposited with a continuous current density range of 0.1-12 ASD. After plating, the panel is removed from the Hull cell, rinsed with DI water and air dried. The nickel deposit appears bright and uniform along the entire current density range.

The foregoing procedure is twice repeated except the pH of the baths are at 4.3 and 4.6. The plating times and parameters remain the same. After nickel plating is completed, the nickel deposits on the brass panels appear bright and uniform along the entire current density range.

EXAMPLE 5

Electroplating Nickel From a Comparative Nickel Electroplating Composition at pH >4

A nickel electroplating composition having the components disclosed in the table below is prepared.

TABLE 4

| COMPONENT | AMOUNT |
|---|---|
| Nickel ions (total) | 90 g/L |
| Chloride ions (total) | 3 g/L |
| Acetate ions (total) | 13.5 g/L |
| Nickel chloride hexahydrate | 10 g/L |
| Nickel acetate tetrahydrate | 25 g/L |
| Nickel sulfate hexahydrate | 365 g/L |
| Acetic acid | 5 g/L |
| Sodium saccharinate | 0.15 g/L |
| Naphthalene trisulfonic acid, sodium salt | 9 ppm |
| Water | To one liter |

The composition is placed in a Hull cell with a brass panel and a ruler along the base of the Hull cell with calibrations of varying current densities or plating speeds. The anode is a sulfurized nickel electrode. Nickel electroplating is done for 5 minutes. The composition is agitated with the Hull cell paddle agitator during the entire plating time. The composition is at a pH of 4 and the temperature of the bath is at about 60° C. The current is 3 A. DC current is applied, producing a nickel layer on the brass panel deposited with a continuous current density range of 0.1-12 ASD. After plating, the panel is removed from the Hull cell, rinsed with DI water and air dried. The nickel deposit appears bright and uniform at the current densities below 4 ASD but begins to show areas of matte deposit intermixed with bright areas up to 10 ASD. After 10 ASD the nickel deposit is substantially matte in appearance.

The foregoing procedure is twice repeated except the pH of the baths are at 4.3 and 4.6. The plating times and parameters remain the same. After nickel plating is completed, the nickel deposits on the brass panels appear bright and uniform up to 4 ASD but then begin to appear substantially matte at higher current densities.

EXAMPLE 6

Synthesis of a Comparative Copolymer of Guanidine and 1,4-Butanediol Diglycidyl Ether Guanidine hydrochloride (9.56 g, 0.1 mol) is suspended in 20 mL isopropanol in a 100 mL round-bottom, three-neck flask equipped with condenser, thermometer, and stir bar at about 80° C. 1,4-Butanediol diglycidyl ether (12.13 g, 0.060 mol) is added dropwise to the solution, and the vial containing the 1,4-butanediol diglycidyl ether is rinsed with 2 mL isopropanol. The heating bath temperature is increased to about 95° C. The resulting mixture is heated for 4 hours, then left to stir at room temperature overnight. The reaction mixture is rinsed with water into a polyethylene bottle for storage and 50% sulfuric acid (10.8 g) is added to solubilize the reaction product. The molar ratio of guanidine moiety to epoxide moiety is approximately 1:0.6 based on monomer molar ratios. The reaction product (Comparative Copolymer 1) solution is used without further purification.

EXAMPLE 7

Synthesis of a Comparative Copolymer 1-(4-Aminobutyl)Guanidine 1-(4-aminobutyl)guanidine dihydrochloride (9.56 g, 0.1 mol) is suspended in 20 mL isopropanol in a 100 mL round-bottom, three-neck flask equipped with condenser, thermometer, and stir bar at about 80° C. 1,4-Butanediol diglycidyl ether (12.13 g, 0.060 mol) is added dropwise to the solution, and the vial containing the 1,4-butanediol diglycidyl ether is rinsed with 2 mL isopropanol. The heating bath temperature is increased to about 95° C. The resulting mixture is heated for 4 hours, then left to stir at room temperature overnight. The reaction mixture is rinsed with water into a polyethylene bottle for storage and 50% sulfuric acid (10.8 g) is added to solubilize the reaction product. The molar ratio of guanidine moiety to epoxide moiety is approximately 1:0.6 based on monomer molar ratios. The reaction product (Comparative Copolymer 2) solution is used without further purification.

EXAMPLE 8

Electroplating Nickel Deposits With Comparative Nickel Electroplating Compositions Containing Comparative Copolymer of Guanidine and 1,4-Butanediol Diglycidyl Ether The following comparative nickel electroplating baths are prepared as disclosed in Table 5 below.

TABLE 5

| COMPONENT | Comparative Bath 3 | Comparative Bath 4 | Comparative Bath 5 |
|---|---|---|---|
| Nickel ions (total) | 50 g/L | 50 g/L | 50 g/L |
| Chloride ions (total) | 3 g/L | 3 g/L | 3 g/L |
| Acetate ions (total) | 21.6 g/L | 21.6 g/L | 21.6 g/L |
| Nickel chloride hexahydrate | 10 g/L | 10 g/L | 10 g/L |
| Nickel acetate tetrahydrate | 25 g/L | 25 g/L | 25 g/L |
| Nickel sulfate hexahydrate | 185 g/L | 185 g/L | 185 g/L |
| Acetic acid | 1.35 g/L | 1.35 g/L | 1.35 g/L |
| Sodium saccharinate | 0.6 g/L | 0.6 g/L | 0.6 g/L |
| Copolymer of guanidine and 1,4-butanediol diglycidyl ether | 5 ppm | 25 ppm | 100 ppm |
| Water | To one liter | To one liter | To one liter |

The comparative baths are placed in Hull cells with brass panels and a ruler along the base of the Hull cells with calibrations of varying current densities or plating speeds. The anode is a sulfurized nickel electrode. Nickel electroplating is done for 5 minutes. The comparative baths are agitated with the Hull cells with Kocour paddle agitators during the entire plating time. The baths range in pH values of 4.7 and the temperature of the comparative baths are about 60° C. The current is 2.5 A. DC current is applied, producing a nickel layer on the brass panels deposited with a continuous current density range of 0.1-10 ASD. After plating, the panels are removed from the Hull cells, rinsed with DI water and air dried.

The nickel deposits across the brass panels range from bright areas at the lower current densities of 0.1 ASD to 3 ASD and matte or dull at the current densities above 3 ASD. Even at the lower current densities the nickel deposits plated from the comparative baths which included the comparative copolymer at concentrations of 25 ppm and 100 ppm show some matte areas, thus there appears no continuous bright uniform areas at concentrations of 25 ppm and 100 ppm. There are noticeably more matte areas at 25 ppm than 5 ppm and the matte areas are even more pronounced at concentrations of 100 ppm than at the two lower concentrations. Matte appearance indicates poor leveling performance.

EXAMPLE 9

Electroplating Nickel Deposits With Comparative Nickel Electroplating Compositions Containing Comparative Copolymer of 1-(4-Aminobutyl)Guanidine and 1,4-Butanediol Diglycidyl Ether The following comparative nickel electroplating baths are prepared as shown in Table 6 below.

TABLE 6

| COMPONENT | Comparative Bath 6 | Comparative Bath 7 | Comparative Bath 8 |
| --- | --- | --- | --- |
| Nickel ions (total) | 50 g/L | 50 g/L | 50 g/L |
| Chloride ions (total) | 3 g/L | 3 g/L | 3 g/L |
| Acetate ions (total) | 21.6 g/L | 21.6 g/L | 21.6 g/L |
| Nickel chloride hexahydrate | 10 g/L | 10 g/L | 10 g/L |
| Nickel acetate tetrahydrate | 25 g/L | 25 g/L | 25 g/L |
| Nickel sulfate hexahydrate | 185 g/L | 185 g/L | 185 g/L |
| Acetic acid | 1.35 g/L | 1.35 g/L | 1.35 g/L |
| Sodium saccharinate | 0.6 g/L | 0.6 g/L | 0.6 g/L |
| Copolymer of 1-(4-aminobutyl)guanidine and 1,4-butanediol diglycidyl ether | 5 ppm | 25 ppm | 100 ppm |
| Water | To one liter | To one liter | To one liter |

The comparative baths are placed in Hull cells with brass panels and a ruler along the base of the Hull cells with calibrations of varying current densities or plating speeds. The anode is a sulfurized nickel electrode. Nickel electroplating is done for 5 minutes. The comparative baths are agitated with the Hull cells with Kocour paddle agitators during the entire plating time. The baths range in pH values of 4.7 and the temperature of the comparative baths are about 60° C. The current is 2.5 A. DC current is applied, producing a nickel layer on the brass panels deposited with a continuous current density range of 0.1-10 ASD. After plating, the panels are removed from the Hull cells, rinsed with DI water and air dried.

The results of the nickel plating are substantially the same as in Example 8. The nickel deposits across the brass panels range from bright areas at the lower current densities of 0.1 ASD to 3 ASD and matte or dull at the current densities above 3 ASD. While there are bright areas at the lower current densities, there are no continuous uniform bright areas. All of the nickel plated brass panels have areas of matte nickel even at the lower current densities. As in Example 8 the matte nickel becomes more pronounced at the higher comparative reaction product concentrations.

What is claimed is:

1. A nickel electroplating composition comprising one or more sources of nickel ions, one or more compounds chosen from sodium saccharinate, boric acid and salts of boric acid, optionally, one or more sources of acetate ions, and one or more copolymers of arginine and one or more bisepoxides, wherein the one or more one or more bisepoxides have a formula:

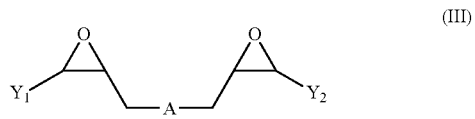

(III)

wherein $Y_1$ and $Y_2$ are independently chosen from H and linear or branched $(C_1\text{-}C_4)$alkyl;

A is $OR_1$ or $R_2$, wherein $R_1$ is $((CR_3R_4)_m O)_n$, wherein $R_3$ and $R_4$ are independently chosen from H, hydroxyl and methyl, and $R_2$ is $(CH_2)_y$, wherein m is a number from 1 to 6, n is a number from 1 to 20 and y is a number from 0 to 6 and when y is 0, A is a covalent chemical bond.

2. The nickel electroplating composition of claim 1, wherein the one or more copolymers of arginine and one or more bisepoxides are in amounts of at least 0.1 ppm.

3. The nickel electroplating composition of claim 1, wherein the one or more sources of acetate ions are chosen from nickel acetate, nickel acetate tetrahydrate, alkali metal salts of acetate and acetic acid.

4. The nickel electroplating composition of claim 1, further comprising one or more sources of chloride.

5. The nickel electroplating composition of claim 1, wherein a pH of the nickel electroplating composition is from 2 to 6.

6. A method of electroplating nickel metal on a substrate comprising:
a) providing the substrate;
b) contacting the substrate with a nickel electroplating composition comprising one or more sources of nickel ions, one or more compounds chosen from sodium saccharinate, boric acid and salts of boric acid, optionally, one or more sources of acetate ions, and one or more copolymers of arginine and one or more bisepoxides, wherein the one or more bisepoxides have a formula:

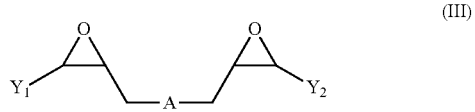

(III)

wherein $Y_1$ and $Y_2$ are independently chosen from H and linear or branched $(C_1\text{-}C_4)$alkyl; A is $OR_1$ or $R_2$, wherein $R_1$ is $((CR_3R_4)_m O)_n$, wherein $R_3$ and $R_4$ are independently chosen from H, hydroxyl and methyl, and $R_2$ is $(CH_2)_y$, wherein m is a number from 1 to 6, n is a number from 1 to 20 and y is a number from 0 to 6 and when y is 0, A is a covalent chemical bond; and
c) applying an electric current to the nickel electroplating composition and substrate to electroplate a bright and uniform nickel deposit adjacent the substrate.

7. The method of claim 6, wherein the one or more sources of acetate ions of the nickel electroplating composition are chosen from nickel acetate, nickel acetate tetrahydrate, alkali metal salts of acetate and acetic acid.

8. The method of claim 6, wherein the nickel electroplating composition further comprises one or more sources of chloride.

9. The method of claim 6, wherein the nickel electroplating composition has a pH of 2 to 6.

* * * * *